Nov. 15, 1960  R. L. KEEFE, JR  2,960,198
GASKET

Filed March 11, 1954  2 Sheets-Sheet 1

INVENTOR
ROBERT L. KEEFE, JR.

BY *Carl A. Hechmer*

ATTORNEY

Nov. 15, 1960  R. L. KEEFE, JR  2,960,198
GASKET
Filed March 11, 1954  2 Sheets-Sheet 2

INVENTOR
ROBERT L. KEEFE, JR.

BY *Carl A. Hechmer*
ATTORNEY

United States Patent Office 2,960,198
Patented Nov. 15, 1960

2,960,198
GASKET

Robert L. Keefe, Jr., New Castle, Del., assignor to E. I. du Pont de Nemours and Company, Wilmington, Del., a corporation of Delaware Filed Mar. 11, 1954, Ser. No. 415,517

4 Claims. (Cl. 189—36)

This invention relates to the sealing of equipment operating under superatmospheric pressures and more particularly to the gasketing of joints in high pressure equipment with delta-shaped gaskets.

During the past several years it has become progressively more common to operate chemical and process equipment under high pressures. Such usage has resulted in various gasketing procedures for rendering joints liquid- and gas-tight against high pressures. One of these has involved the cutting of matching V-grooves in the opposed surfaces of a joint to accomodate a delta-shaped gasket the base of which is substantially normal to the surfaces. By a "delta-shaped" gasket is meant a gasket whose cross-sectional appearance is that of the capital Greek letter "delta." Although this method has been successful in making tight joints under high pressure, it has suffered from several practical disadvantages, among which are (1) the difficulty in perfectly aligning the matching V-grooves and (2) the necessity for maintenance and care of two surfaces containing V-shaped grooves.

It is an object of the present invention to provide a novel delta gasket for use in high pressure equipment.

Another object is to provide a novel seal comprising a delta gasket and a seat therefor between opposed surfaces to confine high pressure.

These and other objects will become apparent in the course of the following specification and claims.

In accordance with the present invention, it has been found that gasketing between opposed surfaces can be attained by providing one surface with a V-groove into which the apex of a delta gasket is fitted, the base of the said gasket being flush with the second surface and thereafter applying to the gasket a compressive force sufficient to seal the joint as fluid under pressure is introduced.

The cross-section of the gasket is preferably that of an isosceles triangle, the apex of which fits into the single V-groove.

The invention will be more readily understood by reference to the figures.

Figure 1:
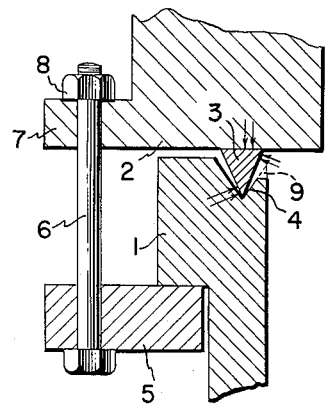
Figure 1 is a sectional elevation showing a delta-shaped gasket providing a seal between opposed surfaces in accordance with the present invention.

Referring particularly to Figure 1 opposed surfaces 1 and 2 are sealed by fitting between them a delta-shaped gasket 3 having its apex fitted into a V-groove 4 in surface 1. The base of the gasket is flush against surface 2. Compressive force between surfaces 1 and 2 is provided by means of bolt 6 and nut 8 which link collar 5 and flange 7. The forces acting on the gasket when pressure is contained are indicated by arrows. Where the V-groove is near the edge of member 1, it is frequently desirable to partially cut away the thin projecting edge as shown at 9. This prevents distortion or damage to the V-groove. The bolts through the flange and collar are then taken up with sufficient torque to maintain a positive compression on the delta gasket when the system is first placed in operation.

The following example is cited to illustrate the invention. It is not intended to limit it in any manner.

Example

A high-pressure apparatus has a joint as shown in Figure 1. The flange and collar are drilled for the bolts on a 6¼" diameter circle. Nine bolt holes 21/32" in diameter are spaced equally around the circumference of the bolt circle. Five-eighth inch bolts of vanadium alloy steel are used. Member 1 has a circular V-groove cut in it 0.156" deep having an included angle of 70°. The circular V-groove has a diameter of 4.426" when measured on its center line. A circular gasket having a delta cross-section is made from a dead soft copper. It has an isosceles triangular cross-section, an apex angle of 50° and a height of 0.190". Its base lies in the plane of its circumference. The diameter of the circumference described by the apex is 4.426". The base of the gasket rests on the uncut member. The apex of the gasket is fitted into the V-groove of the opposed member. In a rupture test on this joint, the bolts were drawn up with a torque of 720 inch-pounds to give a gasket seal which was still leak-proof at the rupture pressure of 15,000 pounds per square inch, at which pressure one of the bolts broke. Under normal operations, it is usual to employ a torque of only 400 inch-pounds on the bolts to assure an initially tight gasket seal. This torque gives a gasket compression of about 0.032". The effect of this compression on the apex area of the gasket is shown by the upset portion 34 in Figure 4. In actual operation, this compression is reduced due to the surface-separating tension applied to the bolts by the confined fluid as the operating pressure builds up.

The relative dimensions of the sides of the cross-section of the delta-shaped gasket may vary. It is preferred that the gasket be substantially in the shape of an isosceles triangle with angles opposite the equal sides within the range of from about 45° to about 75°.

Figure 2:
Figure 2 is a sectional elevation of a ring gasket having a delta-shaped cross-section.
Figure 3:
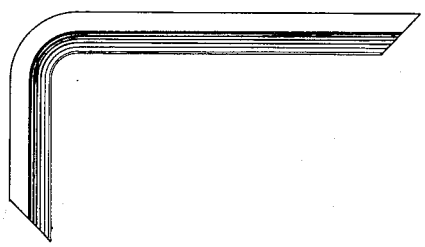
Figure 3 is a plan view of a strip of gasketing having a delta-shaped cross-section.

The shape of the gasketed joint which the gasket matches is not critical. A circular, continuous gasket structure as shown in cross-section in Figure 2 is preferred. However, it may be adapted to other shapes. Rounded corners are desirable in such applications and the limit of acuteness of the corners will be limited primarily by the dimensions of the gasketing. For instance, with a gasket having cross-sectional dimensions, as described in the example, the minimum radius at a corner is about 0.4".

The cross-sectional dimensions of the gasket will vary depending upon the material of which it is made, the pressure to be confined and the like. The dimensions indicated in the example above are typical under the conditions stated.

Figure 4:
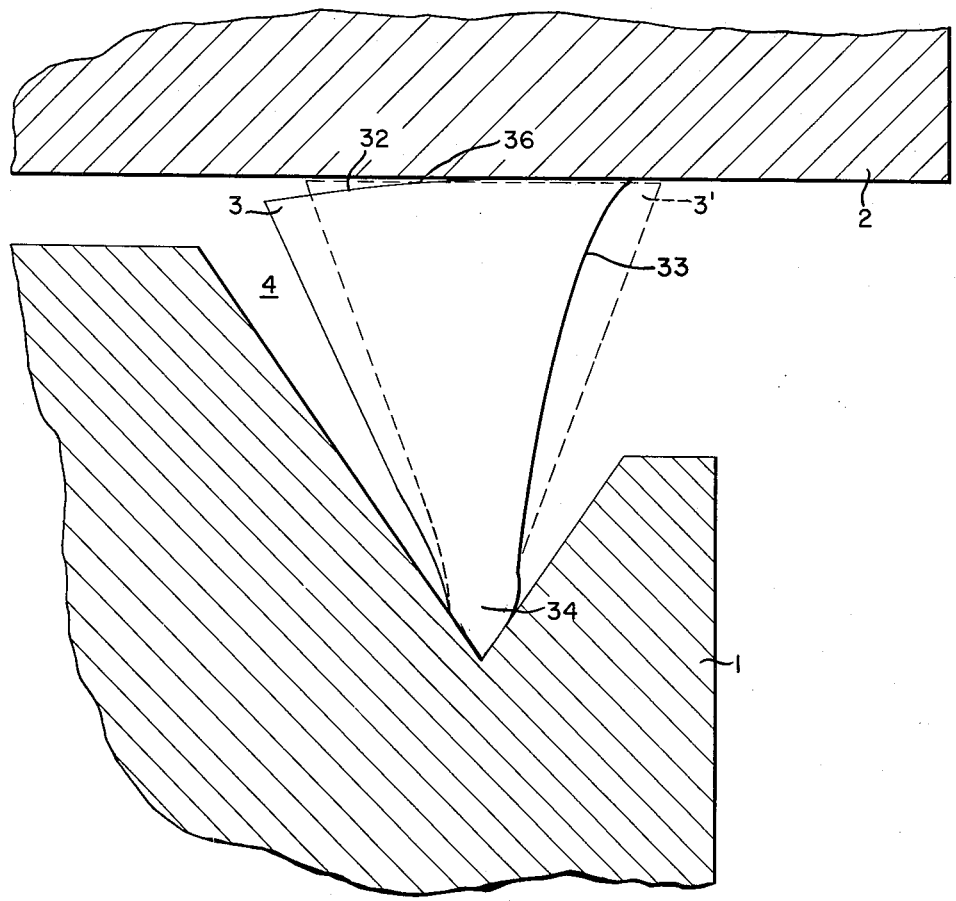
Figure 4 is a greatly enlarged sectional view, showing the deformed configuration of the gasket in full lines and the assembly configuration in broken lines.

As shown in Figure 1, the included angle of the V-groove in member 1 is somewhat larger than the apex of the delta gasket. The difference is in the order of a few degrees. The gasket of the example had an apex angle of 50° and was fitted in a 70° groove. This is sufficient to accommodate the slight increase in dimensions of the delta gasket when it is placed under compression. The reaction of the gasket to the forces employed in assembly is shown in Figure 4 by the upset portion 34 in the region of the apex which portion partially fills the groove. The remaining space in the groove is sufficient to accommodate the slight turning motion which the gasket undergoes as the pressure of the confined fluid rises, as will be explained more fully hereinafter. Such arrangement also facilitates fitting the gasket to the equipment. It is preferred that the low pressure side of the gasket not completely contact its adjacent surface of the V-groove under operating conditions. As long as there is a little space existing between these two surfaces, the delta gasket can adjust itself (Figure 4) to pressure surges in the equipment to produce a highly desirable self-sealing effect. A groove making an angle from about 10° to about 30° larger than the angle of the apex of the delta gasket is satisfactory where the apex is initially centered in the groove. The groove angle may be reduced to 5° larger than the apex angle if this 5° difference all exists on the exterior side of the gasket.

It has been mentioned previously that the gasket is compressed in assembly and partially fills the groove in the area immediately adjacent the apex. As the pressure of the confined fluid builds up, a surface-separating force in opposition to the vertical compressive force on the gasket develops. Before the latter force is reduced to the extent that the security of the sealed joint would be affected, the lateral force exerted by the confined fluid is sufficient to cause the previously mentioned slight turning movement of the gasket. The configurations of the gasket, after the joint has been assembled and after the application of high internal operating pressures, are shown by broken and full lines, respectively, in Figure 4. As specified in the example and elsewhere, the turning motion of the gasket is accommodated by the space remaining in the groove on the low pressure side of the gasket. Any separation of members 1, 2, as a result of the application of internal operating pressures, is offset by the increase in the effective length of the gasket as it turns outwardly in the groove. As the gasket turns, base 32 moves outwardly relative to member 2. The extent of this turning movement is limited by a wedging action between base 32 and member 2. With this wedging action, gasket 3 is deformed to the full line configuration shown in Figure 4. The upset portion 34 remains in a partial groove-filling condition. The side 33, which is exposed to the operating pressures, is slightly concave, and base surface 32 has a slightly convex outline 36 intermediate its end. It is this wedging action which renders gasket 3 self-sealing.

It is essential that the gasket height be slightly greater than the depth of the V-groove to permit the previously mentioned slight compression of the gasket before the joint is put under full interior operating pressure. Where extremely high pressures are employed, in the order of 50,000 p.s.i., harder materials than the dead soft copper of the example will be used in order to prevent undue deformation of the gasket when the joint is initially made preparatory to introducing the pressure into the apparatus. Suitable materials include high alloy and hard stainless steels. Where it may be desired to operate under moderate (10,000 p.s.i.) or relatively low internal pressures, softer gasket materials such as copper, aluminum, rubber, leather and the like would, of course, be preferable. In the apparatus described in the example, where the difference betwen the height of the gasket and the depth of the V-groove is 0.044", it is considered that these relative dimensions would be suitable for a joint of this size, regardless of the operating pressure, just so long as a gasket of the appropriate hardness is chosen.
dbautiablenie The depth of the V-groove necessary to hold the gasket against the internal pressure is dependent upon the internal pressure first of all, and secondly, on the dimensions of the seal. For a pressure of about 5,000 pounds per square inch in the apparatus described, it has been found that the depth of the V-groove is preferably at least 0.094". Usually, however, it is desirable to operate with a depth of the V-groove considerably greater than the minimum required in order to take care of pressure surges in the system and to provide a satisfactory margin of safety for the operation.

The means chosen for exerting compressive force between opposed members disclosed wherein a flange and a collar are employed is not to be interpreted as limitative. Numerous other ways of attaining this result may be used, e.g., the screwing of studs into one member and their use for securing the other member therewith, the threading of one member and the screwing of the other thereinto, the use of clamping members, gland nuts and the like.

Many equivalent modifications will be apparent to those skilled in the art from a reading of the above description without a departure from the inventive concept.

What is claimed is:

1. A pressure confining system comprising opposed surfaces linked by compressive means, gasketing means between the said opposed surfaces consisting of a continuous, deformable gasket having a delta-shaped cross section, the base of the said gasket initially being parallel to and in engagement with one surface, a second side of the said gasket being directly exposed to fluid pressure in the said system, the other of said surfaces having a groove therein and the apex of the said gasket being seated in said groove, the depth of the said groove being slightly less than the altitude of the cross section of the said gasket and there being space remaining in the groove after the surfaces have been linked by said compressive means whereby to permit a turning motion and a corresponding deformation of the gasket under the influence of the fluid pressure, said gasket then having an arched cross sectional configuration with said one side slightly concave through its height and said base slightly convex intermediate its ends.

2. In a pressure confining system, a pair of members each provided with a surface, means interconnecting the members for assembling the members with the respective surfaces thereof in opposed relationship, and sealing means between the surfaces, one of said surfaces having a V-groove cut therein, said sealing means comprising a continuous delta-shaped gasket of deformable material having the apex fitted in said groove and its base initially in flush engagement with the other of said surfaces, the included angle of said groove being greater than the apex angle of said gasket, the latter being upset in the region of its apex into a partial groove-filling condition when the members are assembled and being directly exposed on one side thereof to internal operating pressures when the system is placed in use, said gasket being subject to deformation by a wedging movement of said base relative to said other surface when so exposed, the gasket having an arched cross sectional configuration with said one side slightly concave through its height and said base slightly convex intermediate its ends when so deformed.

3. The system of claim 2 wherein the angle of the groove is at least 5° larger than the initial apex angle of said gasket.

4. The system of claim 2 wherein the angle of the groove is from 10° to 30° larger than the initial apex angle of said gasket.

References Cited in the file of this patent

UNITED STATES PATENTS

| 304,276 | Nuttall | Aug. 26, 1884 |
| 927,611 | Stallings | July 13, 1909 |
| 1,777,101 | McCormack | Sept. 30, 1930 |
| 2,438,513 | Meigs | Mar. 30, 1948 |

FOREIGN PATENTS

| 166,367 | Great Britain | July 21, 1921 |

UNITED STATES PATENT OFFICE
CERTIFICATION OF CORRECTION

Patent No. 2,960,198                                November 15, 1960

Robert L. Keefe, Jr.

It is hereby certified that error appears in the above numbered patent requiring correction and that the said Letters Patent should read as corrected below.

Column 3, line 66, strike out "dbautiablenie".

Signed and sealed this 25th day of July 1961.

(SEAL)
Attest:

ERNEST W. SWIDER
Attesting Officer

DAVID L. LADD
Commissioner of Patents